Patented Aug. 30, 1932

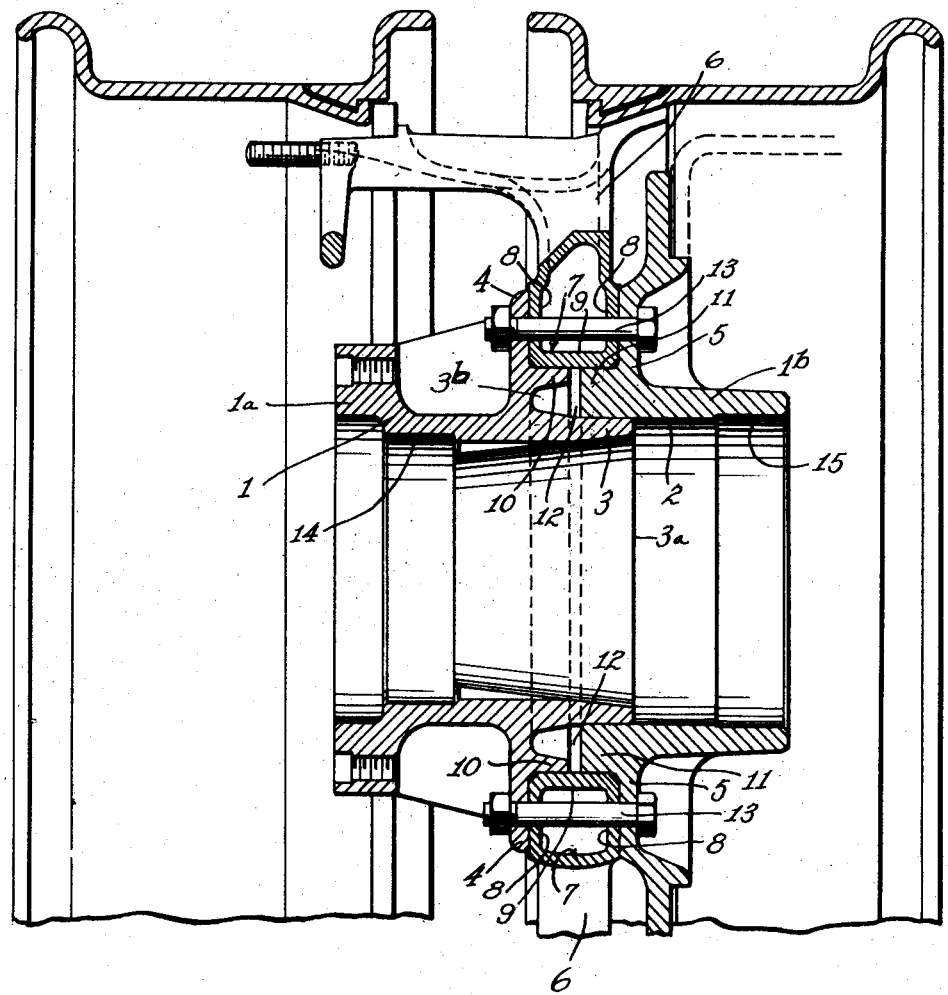

1,874,192

UNITED STATES PATENT OFFICE

LLOYD D. KAY, OF LOS ANGELES, CALIFORNIA, ASSIGNOR TO KAY-BRUNNER STEEL PRODUCTS INC., A CORPORATION

HUB CONSTRUCTION FOR TRUCK WHEELS

Application filed November 12, 1930. Serial No. 495,114.

This invention relates to a hub construction particularly adapted for use in the construction of automobile wheels of heavy type such as dual tired truck wheels. There are a great variety of designs of truck wheels of this type in use and it is frequently necessary to supply orders for wheels having the same body construction but with different features of construction, or dimensions, at the hub. The demand for these variations at the hub entails a considerable investment in patterns and equipments for supplying orders on different specifications.

The general object of this invention is to provide a hub construction which can readily be applied to wheel bodies of different design and which, at the same time, will insure rigidity throughout the entire length of the hub, and a rigid connection to the wheel body so that for all intents and purposes the wheel will have substantially the solidarity of a wheel constructed in one piece.

Further objects of the invention will appear hereinafter.

The invention consists of novel parts and combinations of parts to be described hereinafter, all of which contribute to produce an efficient hub construction for truck wheels.

A preferred embodiment of the invention is described in the following specification, while the broad scope of the invention is pointed out in the appended claim.

In the drawing the figure is a vertical section through a wheel embodying my invention, certain parts being broken away.

In forming a hub construction in accordance with my invention I construct the hub 1 of two sections $1^a$ and $1^b$, the former of which, as illustrated, is the outboard section of the hub and the latter the inboard section. I construct these hub sections so that one of them has a bore and the other has a neck or sleeve which makes a pressed fit in the bore.

In this way the two hub sections are united so that they are substantially as rigid as though formed in one piece. I also provide the hub sections with outwardly projecting flanges or extensions that are disposed in a plane substantially at right angles to the axis of the wheel, and between these faces I clamp the nave of the wheel carried on the hub. In the present instance I prefer to provide the inboard section $1^b$ with a bore 2, and I provide the outboard section $1^a$ with a neck or inner sleeve 3 which has an annular groove $3^b$ at its root; this groove prevents breaking off the sleeve 3 by the compression exerted on it by the hub section $1^b$. The sleeve further makes a press fit in the bore 2 and for this purpose the bore 2 may have a slight taper, though this is not essential.

The sections of the tub are provided with outwardly disposed extensions or flanges 4 and 5 which are disposed opposite to each other, and these flanges are formed in a plane substantially at right angles to the central axis of the hub. A wheel body 6 of any desired form may be employed, but this wheel should have an annular nave 7 preferably of "box form" cross section, as illustrated in the drawing, that is to say, the nave presents two side walls 8 connected by a cylindrical wall 9.

In order to center the wheel body a neck is formed in the hub between the flanges and this neck preferably consists of two extensions or neck portions 10 and 11 which project toward each other, the arrangement being such that a gap 12 is formed between these neck portions, thereby insuring that these necks 10 and 11 will not abut against each other and interfere with the press fit seating of the hub sections together.

In making the wheel, the wheel body 6 is placed on one of the hub sections and the other hub section is then forced into place on a press. In this way the press operates to effect a firm clamping of the nave 7 between the flanges 4 and 5. I prefer to provide fastening means passing through the flanges and the nave of the wheel body and these fasteners are preferably in the form of through-bolts 13, although, if desired, rivets may be employed. The holes for these bolts may be drilled after the parts have been pressed together or if aligning facilities are at hand, the holes may be formed in the separate parts and aligned when the press fit is made.

It will be evident that in order to enable this hub to be attached to any type of wheel body it is merely necessary to form the wheel body with a nave corresponding to the nave 7 and it will, of course, be evident that it is not essential that the nave be constructed of "box form" cross section. A solid nave could be employed, but I prefer a box form nave as it has more resiliency under the compressive force developed by the press. The bolts 13, of course, present ample shearing area so that the driving stresses from the hub to the wheel body can be readily transmitted.

It will also be evident that variations in other features of the hub sections can be employed. For example, if it is required to furnish a hub having a certain diameter of counter-bore 14 at the outboard end of the hub and a certain diameter of counter-bore 15 at the inboard end of the hub, this can be readily accomplished so long as the hub sections have a bore corresponding to the bore 2 and an inner sleeve corresponding to the part 3.

It will be evident that the space between the flanges 4 and 5 forms an annular socket to receive the nave 7 of the wheel body.

In practice the inner end of the sleeve 3 can be cut off at any point desired so as to locate the shoulder 3a at any desired point within the bore 2. This enables the base of the bore of the completed wheel to be adapted to different types, or lengths, of roller bearings.

It is understood that the embodiment of the invention described herein is only one of the many embodiments this invention may take, and I do not wish to be limited in the practice of the invention, nor in the claim, to the particular embodiment set forth.

I claim:

In a hub construction for truck wheels, the combination of an inboard hub section and an outboard hub section, one of said hub sections having a bore and the other hub section having a sleeve fitting into said bore with a pressed fit, said hub sections having flanges projecting outwardly with opposed faces, with a cylindrical neck between said flanges, a portion of said neck being integral with one of said flanges and another portion of said neck being integral with the other of said flanges, the hub section carrying said sleeve having an annular groove formed in its inner face at the root of the sleeve and a wheel body with a nave received on said neck and clamped between said opposing faces, said hub sections having their adjacent faces disposed apart so that the nave is clamped by the pressed fit between the hub sections.

Signed at Los Angeles, California, this 28th day of October, 1930.

LLOYD D. KAY.